(12) United States Patent
Tajima

(10) Patent No.: US 6,989,817 B2
(45) Date of Patent: Jan. 24, 2006

(54) IMAGE DISPLAY UNIT

(75) Inventor: Hisao Tajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 10/287,496

(22) Filed: Nov. 5, 2002

(65) Prior Publication Data
US 2003/0090458 A1 May 15, 2003

(30) Foreign Application Priority Data
Nov. 14, 2001 (JP) .............................. 2001-348838
Oct. 16, 2002 (JP) .............................. 2002-301563

(51) Int. Cl.
G09G 5/00 (2006.01)

(52) U.S. Cl. .................................... 345/156

(58) Field of Classification Search ................ 345/905, 345/156, 8, 204, 87, 30, 1.3, 98, 102, 158, 345/169; 315/169.1–169.3, 583; 349/59; 361/786, 680–687; 320/114
See application file for complete search history.

(56) References Cited

U.S. PATENT DOCUMENTS

| | | | | |
|---|---|---|---|---|
| 5,517,208 A * | 5/1996 | Mori et al. ..................... 345/87 |
| 5,670,994 A * | 9/1997 | Kawaguchi et al. ......... 345/206 |
| 5,867,148 A * | 2/1999 | Kamimaki et al. .......... 345/169 |
| 5,892,971 A * | 4/1999 | Danielson et al. .............. 710/7 |
| 5,978,569 A * | 11/1999 | Traeger ....................... 709/244 |
| 6,023,147 A * | 2/2000 | Cargin et al. ................ 320/114 |
| 6,144,360 A * | 11/2000 | Evanicky et al. ............ 345/102 |
| 6,169,356 B1 | 1/2001 | Ohnishi et al. .............. 313/495 |
| 6,172,867 B1 * | 1/2001 | Satou et al. ................. 361/680 |
| 6,411,353 B1 * | 6/2002 | Yarita et al. ................... 349/59 |
| 6,477,039 B2 * | 11/2002 | Tajima ........................ 361/681 |
| 6,618,240 B1 * | 9/2003 | Kim ............................. 361/681 |
| 6,636,000 B2 * | 10/2003 | Asami et al. ............. 315/169.3 |
| 6,825,811 B2 * | 11/2004 | Iwai et al. .................... 343/702 |
| 6,829,011 B1 * | 12/2004 | Higuchi et al. .............. 348/340 |
| 2001/0046119 A1* | 11/2001 | Hamano et al. ............. 361/687 |
| 2002/0041155 A1* | 4/2002 | Asami et al. ................ 313/583 |
| 2005/0052536 A1* | 3/2005 | Higuchi et al. ......... 348/207.99 |
| 2005/0195092 A1* | 9/2005 | Takahashi et al. ........... 340/692 |

FOREIGN PATENT DOCUMENTS

JP 7-235255 9/1995

* cited by examiner

Primary Examiner—Vijay Shankar
Assistant Examiner—Prabodh Dharia
(74) Attorney, Agent, or Firm—Fitzpatrick, Cella, Harper & Scinto

(57) ABSTRACT

An image display unit includes an image display section and a support structure. The support structure has a higher part and a lower part, wherein the higher part and the lower part individually have circuits, and the circuit having the maximum height is arranged on the lower part.

17 Claims, 8 Drawing Sheets

FIG. 5A
FIG. 5B
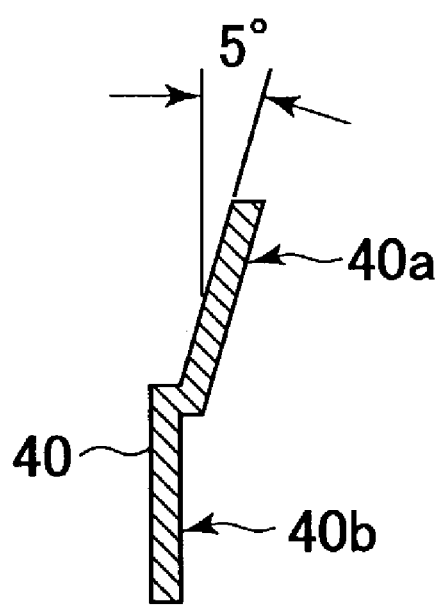
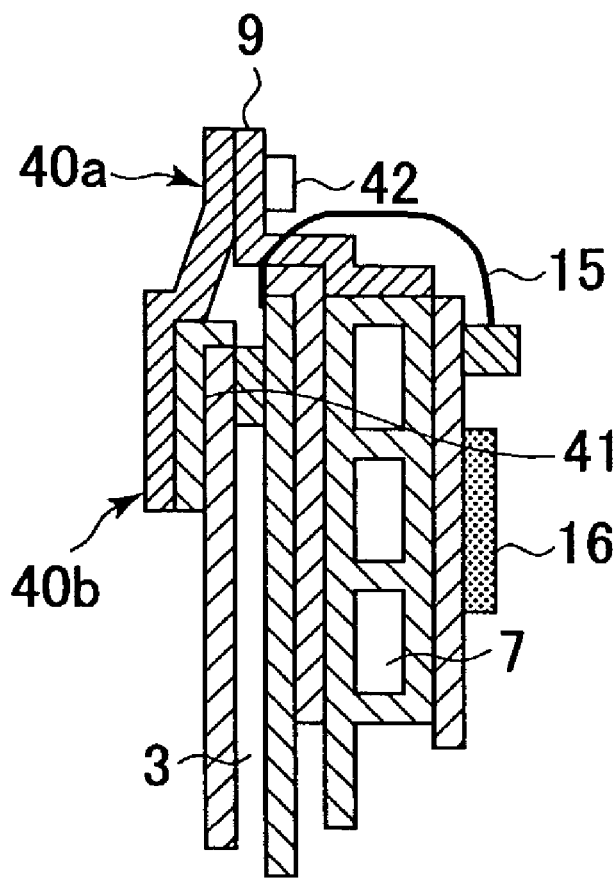

IMAGE DISPLAY UNIT

BACKGROUND OF THE INVENTION

1. Field of the Invention

The present invention relates to an image display unit, and more particularly to a casing structure of the image display unit.

2. Description of the Related Art

Televisions, computer terminals, advertising media, and indicators employ flat-thin-shape image display units including display units using an electron-emission element, plasma discharge, a liquid crystal, and a fluorescent character display tube. Particularly, wall-hung TVs with a diagonal screen size of 40 inches or more receive great attention, making the most of the features of the thin-shape image display units, and the basic structure of such units includes an image display section, an electrical circuit, a support structure, and an exterior.

The conventional flat-thin-shape image display unit will be described more specifically.

FIG. 6 is a longitudinal sectional view of a flat-thin-shape image display unit employing plasma discharge.

According to an example of the conventional flat-thin-shape image display unit shown in this drawing, a vacuum vessel 61, a signal processing circuit 73 and so on serving as an image display section are supported with a frame, which are covered with a cover. More specifically, the vacuum vessel 61, which displays an image, is composed of a face plate having wiring on the inner surface and a rear plate having a fluorescent film, and has a special gas filled therein.

The back of the vacuum vessel 61 is bonded to vertical frames 65 with double-sided-adhesive tapes 67. The vertical frames 65 have lateral frames 66 assembled in grid shape by welding. The vertical frames 65 and the lateral frames 66 are manufactured by extruding an aluminum base alloy.

A front plate 62 is disposed on the front surface of the vacuum vessel 61, the front plate 62 having a function of an optical filter for protecting the front surface and improving the picture quality and a function of preventing the leakage of electromagnetic waves. The front plate 62 is attached with attachment sections of a front cover 63 covering the front and side of the vacuum vessel 61.

The vertical frames 65 and the lateral frames 66 have fixing brackets 68 for fixing them to the front cover 63. The vacuum vessel 61 supported by a frame structure made up of the vertical frames 65 and the lateral frames 66 is supported in the front cover 63 by fixing the fixing brackets 68 to the front cover 63 with screws 69.

The lateral frames 66 mount a substrate of a Y-directional driver circuit 72 having an IC that generates electrical drive signals for image display, a substrate of a signal processing circuit 73 having tall electrical components thereon, a substrate of a supply circuit 74 having tall electrical components including a capacitor and a transformer, and a substrate of a signal input circuit 75 for inputting image signals from the exterior. The Y-directional driver circuit 72 is electrically connected to the vacuum vessel 61 with a flexible cable 71.

A back cover 64 for covering the back of the image display unit is connected to the front cover 63 with screws 70. The back cover 63 is resistant to the entry of dirt and water into the image display unit.

The above structure in which the vertical frames 65 and the lateral frames 66 are assembled in grid shape by welding for supporting the vacuum vessel 61 has a sufficient strength to protect the vacuum vessel 61 from impact and vibration from the exterior. Furthermore, since weight reduction of the image display unit is also important to provide marketability of a wall-hung unit, the vertical frames 65 and the lateral frames 6 have a U-shape or rectangle-shape in cross section with a thickness of about 10 mm, though they have a small wall thickness of about 1.5 mm. Electrical components including the supply circuit 74 to be mounted on the lateral frames 66 are arranged on planes of the same height in view of the structure of the electrical circuit, as shown in the drawing.

FIG. 7 is a longitudinal sectional view of an example of a conventional flat-thin-shape image display unit employing plasma discharge. The same functional components as those of the previous example are given the same reference numerals and a description thereof will be omitted.

The flat-thin-shape image display unit shown in FIG. 7 includes a chassis 81 made of an aluminum base alloy with a wall thickness of about 3 to 5 mm and formed by die casting in place of a support structure including the vertical frames and the lateral frames for supporting the vacuum vessel 61 with the double-sided adhesive tape 67, shown in FIG. 6. The chassis 81 includes projections 82, which are arranged like ribs in the space between the electrical circuits including the supply circuit 74 in order to increase the rigidity against the bend of the chassis 81.

With such a structure, the chassis 81, which supports the vacuum vessel 61, has a sufficient strength to protect the vacuum vessel 61 from impact and vibration from the exterior in corporation with the projections 82. Furthermore, since this image display unit has a thin-shape image display section, it is important to provide a thin-shape casing structure for marketability. Therefore, a back cover 83 is provided and the thickness from the front surface of the casing to the back surface is as small as 15 to 17 mm as compared with the first conventional example. The electrical components including the supply circuit 74 mounted on the chassis 81 are arranged on planes of the same height in view of the structure of the electrical circuit, as shown in the drawing.

SUMMARY OF THE INVENTION

The present invention provides a thin-shape image display unit as a whole. The present invention also provides an image display unit with a reduced back protrusion. The present invention further provides an image display unit capable of accurately driving an image display section.

The present application includes the following inventions:

An image display unit including an image display section, comprising a support structure supporting the image display section and a plurality of circuits disposed on the back of the support structure. The plurality of circuits has different heights from the back of the support structure. The support structure includes a higher part having a predetermined height in the direction from the front of the image display section to the back and a lower part lower than the higher part in the direction described above, the higher part and the lower part individually having the plurality of circuits, with the circuit having the maximum height arranged on the lower part.

Here, the height of each part of the support structure is the length of a perpendicular line dropped from each part to a display surface of the display section. The height of the circuit from the back of the support structure is the length of a perpendicular line dropped from the circuit to the back (a back side surface of the support structure opposite to the image display section) of the support structure directly under the circuit.

The heights will be specifically described with reference to FIG. 8. A display section 1001, corresponding to a vacuum vessel constituted by a face plate and a rear plate in the embodiments, will be described later. The front surface of the display section 1001 serves as a display surface in this example, and the front surface of the face plate serves as the display surface in the after-mentioned embodiments. Perpendicular lines are dropped from parts (a higher part 1009 and a lower part 1010) of a support structure 1002 to the display surface. The lengths 1003 and 1004 are the heights of the higher and lower parts of the support structure, respectively. The heights of circuits 1005 and 1006 are the lengths 1007 and 1008 of the perpendicular lines dropped to the corresponding back surface of the support structure, respectively. When the heights of the parts of the support structure directly thereunder are not even or when the circuit is mounted at an angle, the maximum value of the lengths of the perpendicular lines is the height of the circuit. Here, an example is shown in which the support structure has higher parts with one height and lower parts with a height lower than those of the higher parts. However, the support structure may have other parts higher than the higher parts of this example and other parts lower than the lower parts of this example.

Preferably, the present invention employs a structure in which the higher parts are arranged in a picture-frame shape. Particularly, it is preferable that the higher parts be arranged so as to construct a closed picture-frame shape.

Alternatively, the lower part is preferably arranged so as to be surrounded by the higher parts arranged in picture-frame shape. Also, preferably, the circuit having the maximum height is arranged so as to be housed in a recessed portion formed by the lower part and the circumferential higher parts.

Also, preferably, the higher parts are positioned in the circumferential vicinity of the image display section. Here, the circumferential vicinity of the image display section indicates a location closer to the circumference of the image display section than the lower part having the circuit with a maximum height. Particularly, the image display section includes a plurality of display elements and a plurality of wirings for applying signals that drive the display elements to the display elements. In this structure, the signals are preferably supplied to the wirings from the circumference of the image display section, wherein the higher parts are arranged in the circumferential vicinity of the image display section and circuits for supplying the signals to the wirings are provided at the higher parts; thus, the circuits can be arranged in the vicinity of the signal supply terminals to the wirings. Accordingly, the loss of the signals can be decreased, thus realizing an accurate driving.

Preferably, the circuit provided at the lower part is a supply circuit for supplying electric power to at least the plurality of circuits provided at one of the parts. Particularly, it is preferable that a power source for supplying electrical power to at least the circuits provided at the higher parts be provided at the lower part.

Preferably, the difference between the heights of the higher part and the lower part is 5 mm or more in order to obtain a sufficient strength of the support structure.

Preferably, the lower and/or higher parts are made of electromagnetically shielding material. Thus, an undesired influence of electromagnetic waves can be reduced. The electromagnetically shielding material may employ metal.

Preferably, at least part of the support structure is made of an electrically conductive material and is provided with a ground potential. Particularly, the higher or lower parts or the higher and lower parts are preferably made of an electrically conductive material and are provided with a ground potential.

Further objects, features and advantages of the present invention will become apparent from the following description of the preferred embodiments with reference to the attached drawings.

BRIEF DESCRIPTION OF THE DRAWINGS

FIGS. 5A and 5B are explanatory views of a front frame shown in FIG. 4, wherein FIG. 5A shows the shape of the front frame before assembly and FIG. 5B shows the periphery of the front frame after assembly on an enlarged scale.

DESCRIPTION OF THE PREFERRED EMBODIMENTS

Figure 1:
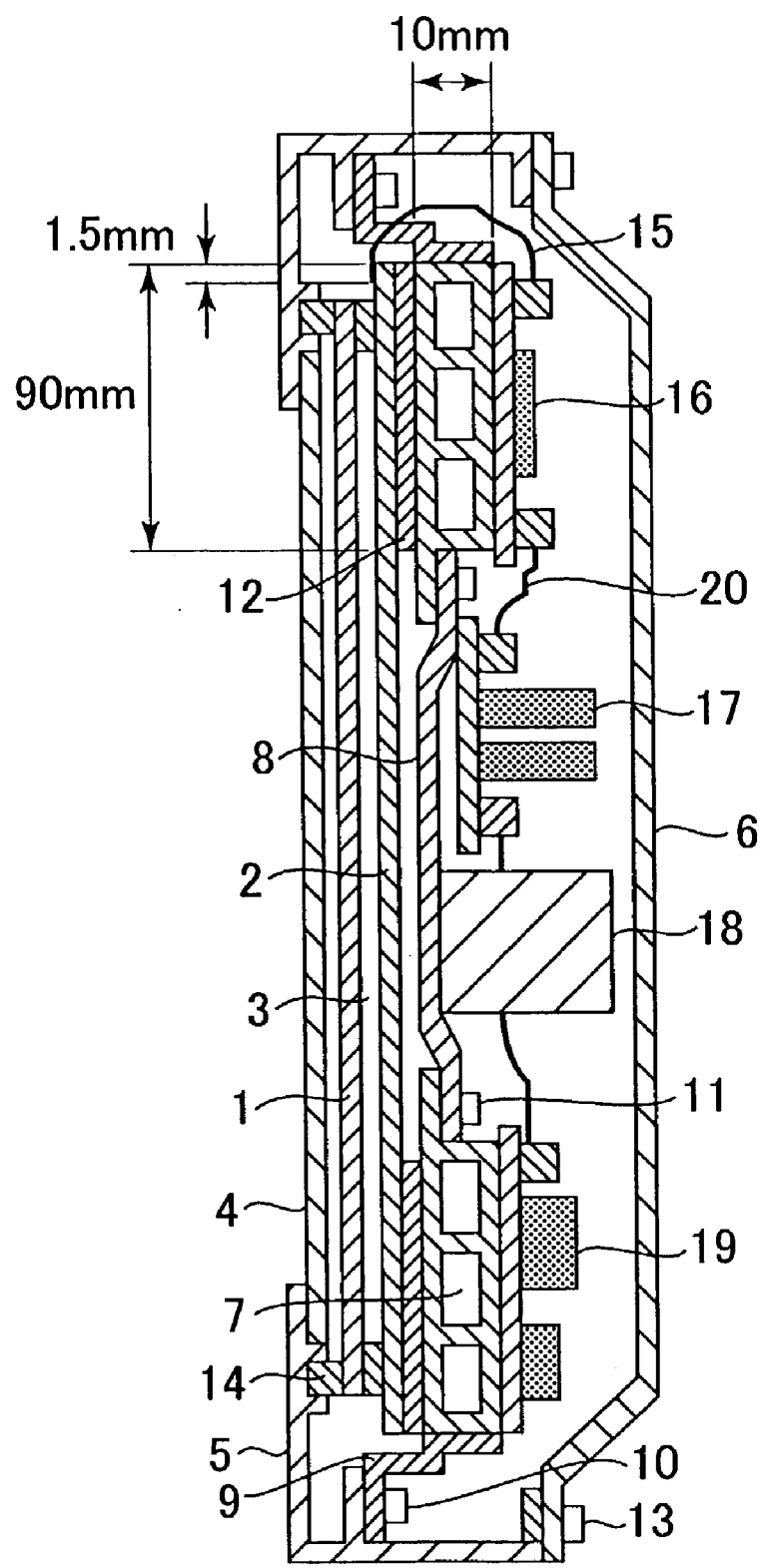
FIG. 1 is a longitudinal sectional view showing the most notable characteristics of an image display unit according to a first embodiment of the present invention.

The following embodiments adopt an image display unit in which the support structure includes a back frame having a predetermined thickness in the direction from the front of the image display section to the back as a higher part, and a thinner part having a thickness smaller than the back frame in the direction of the thickness as a lower part. The back frame protrudes in the direction of the thickness greater than the thinner part, having a first circuit for driving the image display section on a surface of the back frame protruding greater than the thinner part, and a second circuit for driving the image display section with a thickness larger than the first circuit in the direction of the thickness, on a surface of the thinner part on the back of the image display section.

In this image display unit, the back frame is a hollow frame shaped like a picture frame; and the thinner part is a plate arranged in a position to cover the opening of the hollow frame; wherein a recessed portion constructed by the back frame and the plate accommodates the second circuit. A substantially closed space is formed by the image display section, a front plate arranged so as to face the front surface of the image display section, and a frame member surrounding the image display section except an image display area in picture frame shape. Also, the image display section is supported and bonded only on the back frame with an adhesive means.

Also, the image display unit has a front frame in picture frame shape on the front surface thereof; and the image display section is sandwiched by the front frame and the back frame with dampers on the front and back of the image display section, respectively. The front frame has elasticity to generate an inner stress in the direction to sandwich the image display section all the time. A substantially closed space is formed by the image display, the front plate arranged so as to face the front surface of the image display section, and the damper on the front surface of the image display section.

A driver circuit for supplying signals for driving the image display section (signals applied to the wiring for supplying signals to the display elements of the image display section) is positioned at the higher part, and a supply circuit used for supplying electrical power to drive the image display section, particularly, a supply circuit for supplying electrical power to all circuits including the circuits positioned at the higher part is positioned at the lower part. Also, the thin plate, which is the lower part, is made of an electromagnetically shielding material. The back frame, the front frame, and the thin plate have an electrically ground potential.

Particularly, the back frame constituting a higher part is a hollow frame shaped like a picture frame; and the lower part is a plate arranged to cover the opening of the hollow frame; wherein a recessed portion constructed by the back frame and the plate accommodates the second circuit. Accordingly, the weight of the support structure can be reduced because of the hollow back frame. Particularly, using the hollow frame shaped like a picture frame allows the image display section to have increased rigidity for protecting it from the external impact and vibration without increasing the weight.

A substantially closed space is formed by the image display section, the front plate arranged to face the front surface of the image display section, and a frame member that surrounds the image display section except an image display area in the form of a picture frame; thus, a phenomenon that dirt enters the casing from the exterior to make the display screen dirty, making an image hard to see, is prevented.

The image display section is adhered to only the back frame with an adhering means to support the image display; therefore, when a double-sided adhesive tape is used as the adhering means, the amount of the double-sided adhesive tape used is reduced.

The image display section has a front frame in picture-frame shape on the front surface; and the image display section is sandwiched by the front frame and the back frame with dampers arranged on the front and back of the image display section, respectively, so that the image display section can be protected from the external vibration and impact, and the drop thereof can be prevented.

In the following example, the back frame, the front frame, and the thinner part (plate) have a ground potential, thereby stabilizing the waveforms of the image display signal flowing in the wirings in the image display section, and reducing the leakage of undesired electromagnetic waves to the exterior.

The operational principal of the image display section of the flat-thin-shape image display unit according to the following embodiments will be described hereinafter. The image display section uses an electron-emission element, particularly, a surface-conductive emission element. The operation of the electron-emission element will be described. Electrons are emitted from an electron-emission element of the rear plate by applying a voltage of ten-odd volts between an X-directional wiring and a Y-directional wiring, which are selected in the electrical circuit. The emitted electrons are accelerated by a positive potential of ten-odd kV supplied from an external high-voltage power source to a metalized film on the vacuum-space-side face plate to collide against a fluorescent film, thereby causing light emission. A flexible cable connecting between the rear plate and the electrical circuit is connected to the electrical circuit with a connector electromechanically, and on the other hand, is electromechanically connected to the electrodes (wiring ends) of the X-directional wiring and the Y-directional wiring printed on the rear plate with an anisotropic conductive film. A high-voltage cable connecting the metalized film of the face plate and the high-voltage supply circuit is electromechanically connected to the high-voltage supply circuit with a high-voltage connector. On the other hand, for the face plate, it is electromechanically connected to the metalized film through a high-voltage terminal disposed in a through hole in the rear plate. A detailed description is disclosed in Japanese Patent Laid-Open No. 07-235255 and the embodiment can be referred to the document.

Hereinafter, embodiments of the present invention will be specifically described with reference to the drawings.

(First Embodiment)

Figure 2:
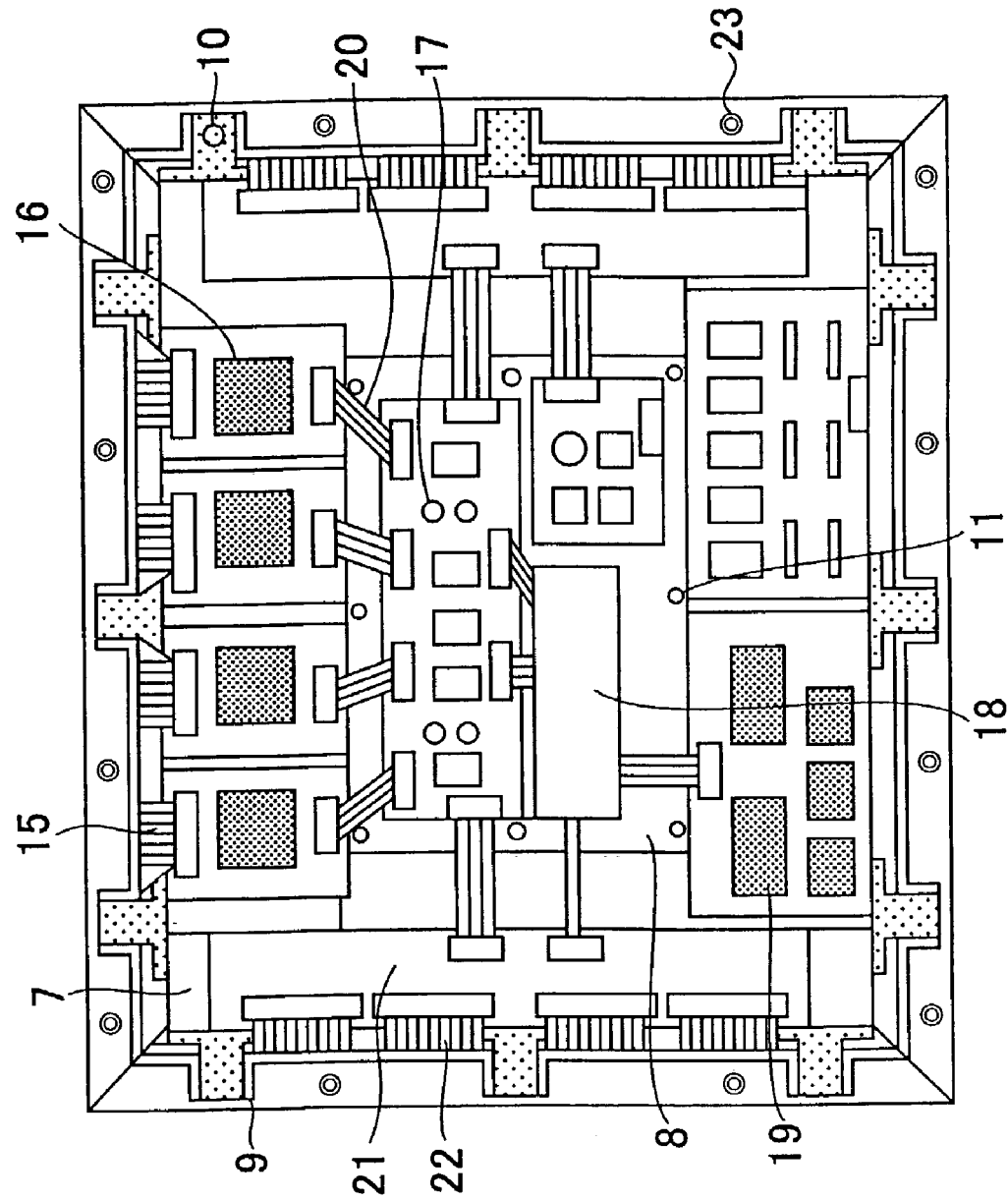
FIG. 2 is a plan view of the image display unit of FIG. 1, seen from the back with the exterior removed.

FIG. 1 is a longitudinal sectional view showing the most notable characteristics of an image display unit according to a first embodiment of the present invention. FIG. 2 is a plan view of the image display unit of FIG. 1, seen from the back with the exterior removed.

The image display unit shown in FIG. 2 includes a vacuum vessel 3 that is evacuated, as an image display section (display panel) for displaying an image. The vacuum vessel 3 is composed of a face plate 1, a rear plate 2, and a frame member. The face plate 1 includes an RGB fluorescent film and a high-voltage area made of metalized film on a glass substrate. The rear plate 2 has a structure in which an X-directional wiring and a Y-directional wiring and an electron-emission element are provided on a glass substrate.

The back of the vacuum vessel 3 is adhered to a hollow frame 7 with a double-sided adhesive tape 12 shaped like a picture frame. The hollow frame 7 is formed such that an aluminum base alloy is extruded and then cut into a predetermined dimension, thereafter constructed in a picture-frame shape with a connector such as a screw (not shown). The hollow frame 7 of this embodiment has three hollow portions, as shown in a sectional view of FIG. 1; however, the present invention is not limited to that.

The face plate 1 includes, in the opposite direction to the rear plate 2, a front plate 4 having a function of an optical filter for improving a display characteristic, a function of reducing electromagnetic waves generating from inside electrical circuits, and a function of protecting the inside from dirt and collision of an object, constructing the front surface of the image display unit.

The front plate 4 is mounted to a front cover 5 for covering the rim of the front surface and the side of the vacuum vessel 3. The front cover 5 protects the image display section and electrical circuits, which will be described later, from dirt and moisture and also has a good appearance. The front cover 5 is formed such that an electrically-conductive aluminum base alloy is extruded and then cut into a predetermined dimension, thereafter constructed in a picture-frame shape. The front cover 5 has a groove or a projection that makes up a groove on the inner surface thereof at the periphery of the front plate 4. A sealing member 14 is fitted into the groove. The end face of the sealing member 14, which is exposed from the groove, is in close contact with the surface of the face plate 1.

A support bracket 9 for supporting the front cover 5 is provided on the periphery of the hollow frame 7. The front cover 5 is supported on the hollow frame 7 by connecting the support bracket 9 to the front cover 5 with screws 10.

A rear cover (also called a back cover) 6 for covering the back of the image display unit is connected to the front cover 5 with screws 13. The rear cover 6 prevents the entry of dirt or foreign matter into the image display unit, and at the time of maintenance, it can easily be mounted or dismounted with the screws 13, being manufactured such that a rigid aluminum base alloy is processed by metal molding. The front cover 5 includes female screws 23 for fixing the rear cover 6 with the screws 13.

A plate member 8 is joined to the hollow frame 7 shaped like a picture frame with screws 11 and arranged at a position to cover an opening at the center of the hollow frame 7. The plate member 8 is made of an electromagnetically shielding material such as an aluminum base alloy formed in a desired shape by pressing, having a thickness of 1.5 mm.

The plate member 8 (on the surface on the back of the display unit) includes a substrate of a signal processing circuit 17 having a function of converting an analog signal to a digital signal and controlling an electrical circuit system and a supply unit 18 serving as a supply circuit for generating a constant DC voltage required in each electrical circuit.

The hollow frame 7 (on the surface on the back of the display unit) includes: a substrate of a Y-directional driver circuit 16 for generating an electric drive signal (selected driving with pulse-width modulation) for image display; a substrate of an X-directional driver circuit 21 (refer to FIG. 2) for outputting an electric drive signal (scanning signal) for image display from a signal processing circuit 17 to a matrix wiring of the rear plate 2 through a flexible cable 22; and a substrate of a signal input circuit 19 having a function of inputting various signals from the exterior (such as an NTSC, a video, and a PC) and blocking undesired signals. Particularly, the X-directional driver circuit 21 is arranged on the right and left of the image display section one to each while sandwiching the opening of the hollow frame 7 (refer to FIG. 2).

The flexible cable 22 connects to the X-directional driver circuit 21 with a disengageable connector, and also connects to an electrode pattern on the rear plate 2 through an anisotropic conductive tape (not shown).

The Y-directional driver circuit 16 connects electrically to the rear plate 2 through the flexible cable 15. The flexible cable 15 connects to the Y-directional driver circuit 16 with a disengageable connector, and also connects to an electrode pattern on the rear plate 2 through an anisotropic conductive tape (not shown). An output signal from the signal processing circuit 17 is transmitted to the Y-directional driver circuit 16 through a wiring 20.

A characteristic inner structure of the present invention will be described.

The hollow frame 7 and the plate member 8 must be rigid to protect the vacuum vessel 3 for image display from vibration and impact from the exterior, and also the front to back surface of the casing of the display unit must be small in thickness. Accordingly, as shown in FIGS. 1 and 2, the hollow frame 7 shaped like a picture frame principally functions for the rigidity; and in order to provide a thinner casing, the signal processing circuit 17 and the supply unit 18, which are thick in the direction from the front to the back of the display unit, are mounted on the plate member 8 thinner than the hollow frame 7, and thin-shape electrical circuits including the Y-directional driver circuit 16, the signal input circuit 19, and the X-directional driver circuit 21 are mounted on the hollow frame 7. In other words, the supply circuit having a maximum thickness (the height from the support structure) is provided not on the hollow frame 7 that is a higher part of the support structure but on the plate member 8 lower than the higher part.

Furthermore, in order to provide both rigidity and lightweight, the hollow frame 7 is constructed in the form of a rectangle (refer to FIG. 1) with a wall thickness of 1.5 mm and of 10 mm×90 mm in section, having two ribs therein, thus increasing the rigidity without increasing the weight.

Electrically, both the hollow frame 7 and the plate member 8 are made of conductive material and are grounded to stabilize the waveforms of the image display signals flowing in the vacuum vessel 3 and in the wirings on the surface of the rear plate 2 and also to reduce undesired electromagnetic waves leaking to the exterior.

The double-sided adhesive tape 12 for adhering the hollow frame 7 to the rear plate 2 is constructed such that an acrylic base adhesive are placed on both sides of an acrylic or olefin base substrate, having a thickness of 0.6 mm to 1.2 mm, thereby absorbing the warp of the vacuum vessel 3 and hollow frame 7 sufficiently and preventing the drop of the vacuum vessel 3 with a strong adhesive force.

The sealing member 14 is disposed to the vacuum vessel 3 in a picture frame shape to form a substantially closed space with the front plate 4 and the face plate 1. Accordingly, even if dirt enters from the exterior through, for example, the gap between the front cover 5 and the rear cover 6 and a heat-releasing hole (not show) opened in the upper and lower parts of the rear cover 6, it cannot enter the substantially closed space; thus the display screen is prevented from becoming dirty to hard to see.

The front cover 5 of this embodiment can obtain the similar advantages even when it is made of a magnesium base alloy. Also, the picture-frame shape may be formed integrally not by extruding but by die casting.

With such a structure, the image display unit has the following advantages:

1) Since high-profile electrical circuits including the supply unit 18 are disposed on the plate member 8 and thin-shape electrical circuits including the Y-directional driver circuit 16 are disposed on the hollow frame 7, the thickness of the whole casing is reduced; thus, the marketability is increased.

2) Since the 10-mm-thick hollow frame 7 shaped like a picture frame and the 1.5-mm-thick plate member 8 arranged at the center are used, the support structure of the vacuum vessel (image display section) 3 can be reduced in weight; thus, the marketability is increased.

3) Since the vacuum vessel 3 is protected from an external impact and vibration by the 10-mm-thick hollow frame 7 shaped like a picture frame, the reliability is increased.

4) Since the hollow frame 7 and the plate member 8 are grounded electrically, the waveforms of image display signals flowing in the wirings on the surface of the rear plate 2 are stabilized; thus, the image quality is improved and undesired electromagnetic waves leaking to the exterior can be decreased, so that the marketability is increased and the load on environment is reduced.

5) Since the amount of the double-sided adhesive tape 12 used for adhering the vacuum vessel 3 and the hollow frame 7 is decreased as compared with the conventional art, the cost can be reduced.

6) Since a substantially closed space is formed by the sealing member 14 shaped like a picture frame, the front plate 4, and the face plate 1, a phenomenon that dirt enters the casing from the exterior to make the display screen dirty, making it hard to see, is prevented; thus, the reliability is increased.

(Second Embodiment)

Figure 3:
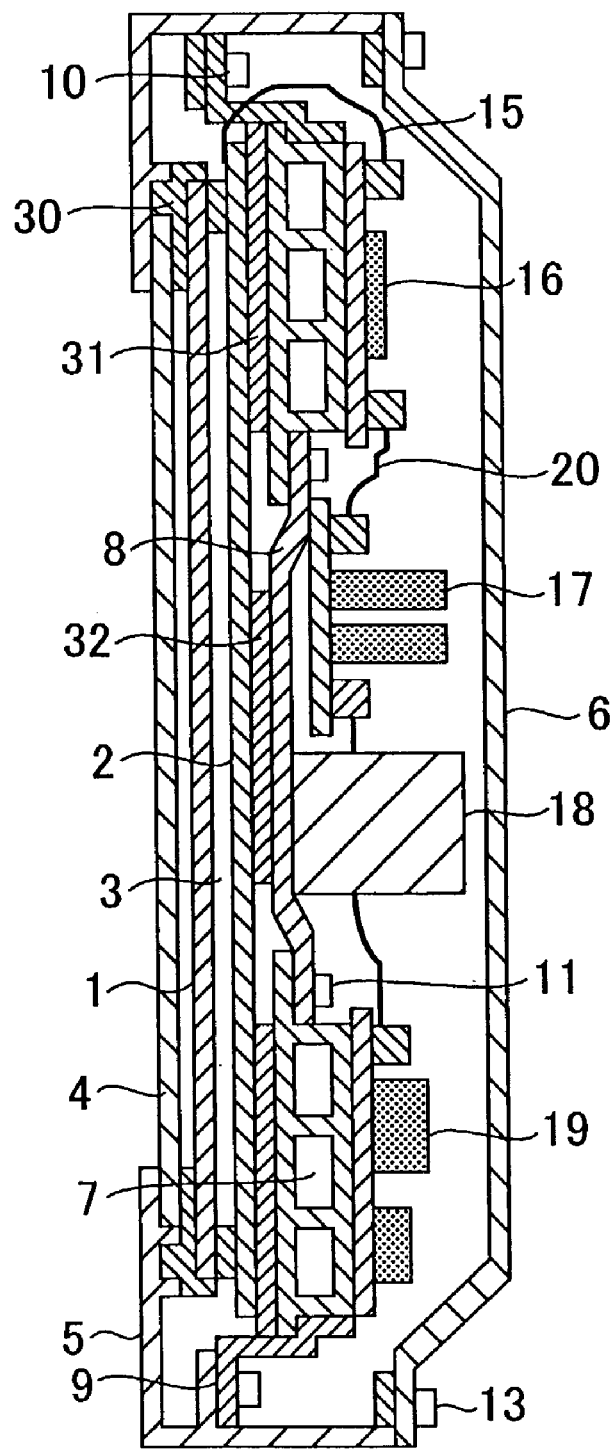
FIG. 3 is a longitudinal sectional view showing the most notable characteristics of an image display unit according to a second embodiment of the present invention.

FIG. 3 is a longitudinal sectional view showing the most notable characteristics of an image display unit according to a second embodiment of the present invention.

The structure of the second embodiment will be specifically described hereinafter. Components similar to those of the first embodiment are denoted by the same reference numerals and a description thereof will be omitted.

A front damper 30 is fitted in a groove or a projection that makes up a groove on the inner surface of the front cover 5 at the periphery of the front plate 4, the front damper 30 being disposed in a picture frame shape to the vacuum vessel 3 excluding an image display area and having a projection surrounding the circumferential edge of the face plate 1 in close contact with the face plate 1. The front damper 30 is made of an elastic material such as a hard urethane foam resin.

A rear damper 31 is disposed between the rear plate 2 and the hollow frame 7, the rear damper 31 being disposed in a picture frame shape to the vacuum vessel 3, and located on the circumference of the hollow frame 7 in close contact with the rear plate 2. The rear damper 31 is made of an elastic material such as a hard urethane foam resin.

A central damper 32 is disposed between the rear plate 2 and the plate member 8 so as to fill the gap therebetween. The central damper 32 is made of an elastic material such as a hard urethane foam resin.

A characteristic structure of the present invention will be described hereinafter.

The hollow frame 7 and the plate member 8 serving as a support structure are disposed on the back of the vacuum vessel 3. The hollow frame 7 has thin-shape electrical circuit components including the Y-directional driver circuit 16. The plate member 8 has high-profile electrical circuit components including the supply unit 18 thereon. With such a structural arrangement, the support structure of the vacuum vessel 3 can be decreased in weight and the whole casing can be made thin-shape while maintaining rigidity.

The vacuum vessel 3 is supported between the hollow frame 7 and the front cover 5 through the front damper 30 and the rear damper 31. The vacuum vessel 3 can be dismounted from the unit casing by removing the screws 10 for recycling the unit. Since the front damper 30 and the rear damper 31 sandwich the circumference of the vacuum vessel 3 in the form of a picture frame, the vacuum vessel 3 can be protected from the external vibration and impact and also the drop of the vacuum vessel 3 can be prevented.

The use of the central damper 32 prevents the risk that the vacuum vessel 3 warps by a great impact from the exterior to collide against the plate member 8.

Since a substantially closed space is formed by the front plate 4, the face plate 1, and the front damper 30, a phenomenon that dirt enters the casing from the exterior to make the display screen of the face plate 1 dirty is prevented. Also, the hollow frame 7 and the plate member 8 are grounded electrically as in the first embodiment.

With such a structure, the image display unit has the following advantages:

1) Since high-profile electrical circuits including the supply unit 18 are disposed on the plate member 8 and thin-shape electrical circuits including the Y-directional driver circuit 16 are disposed on the hollow frame 7, the thickness of the whole casing is reduced; therefore, the marketability is increased.

2) Since the 10-mm-thick hollow frame 7 shaped like a picture frame and the 1.5-mm-thick plate member 8 arranged at the center are used, the support structure of the vacuum vessel 3 can be reduced in weight; thus, the marketability is increased.

3) Since the vacuum vessel 3 is protected from an external impact and vibration by the 10-mm-thick hollow frame 7 shaped like a picture frame, the reliability is increased.

4) Since the hollow frame 7 and the plate member 8 are grounded electrically, the waveforms of image display signals flowing in the wirings on the surface of the rear plate 2 are stabilized; thus the image quality is improved and undesired electromagnetic waves leaking to the exterior can be decreased, so that the marketability is increased and the load on environment can be reduced.

5) Since the vacuum vessel 3 is sandwiched by the front cover 5 and the hollow frame 7 through the dampers 30 and 31, disassembly workability in recycling is improved.

6) Since a substantially closed space is formed by the front damper 30 shaped like a picture frame, the front plate 4, and the face plate 1, a phenomenon that dirt enters the casing from the exterior to make the display screen dirty, thus making it hard to see, can be prevented; thus, the reliability is increased.

(Third Embodiment)

Figure 4:
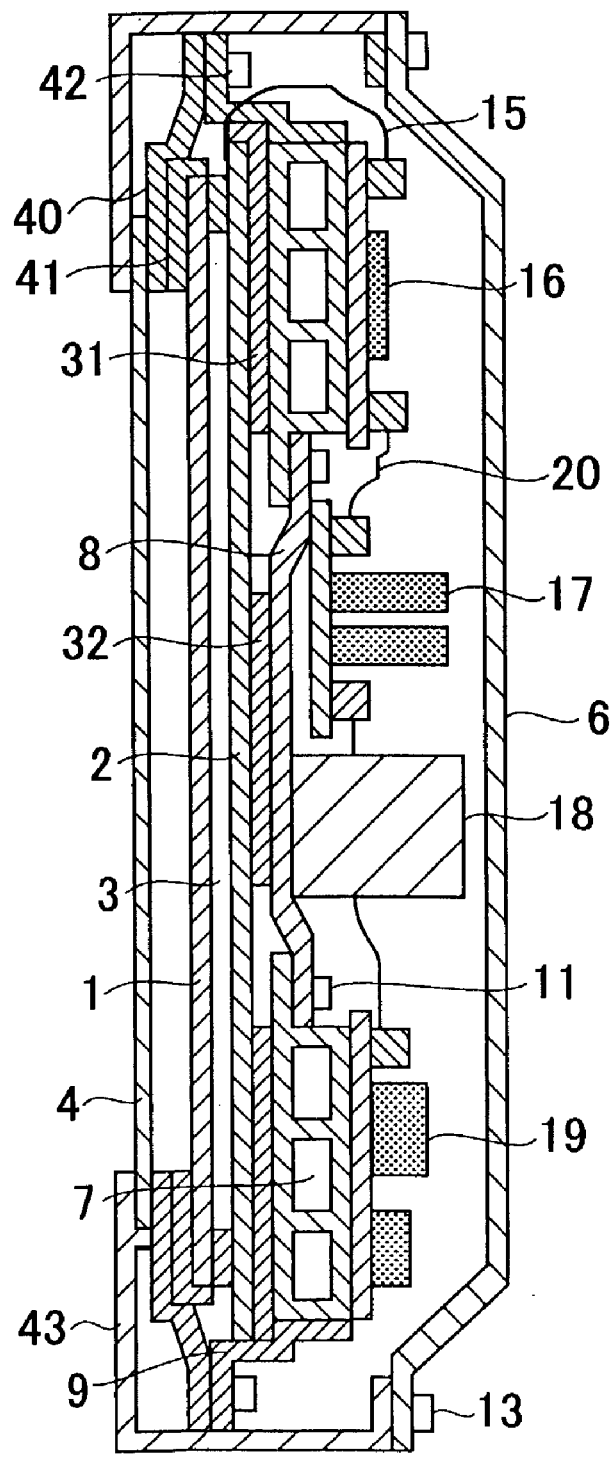
FIG. 4 is a longitudinal sectional view showing the most notable characteristics of an image display unit according to a third embodiment of the present invention.
Figure 6:
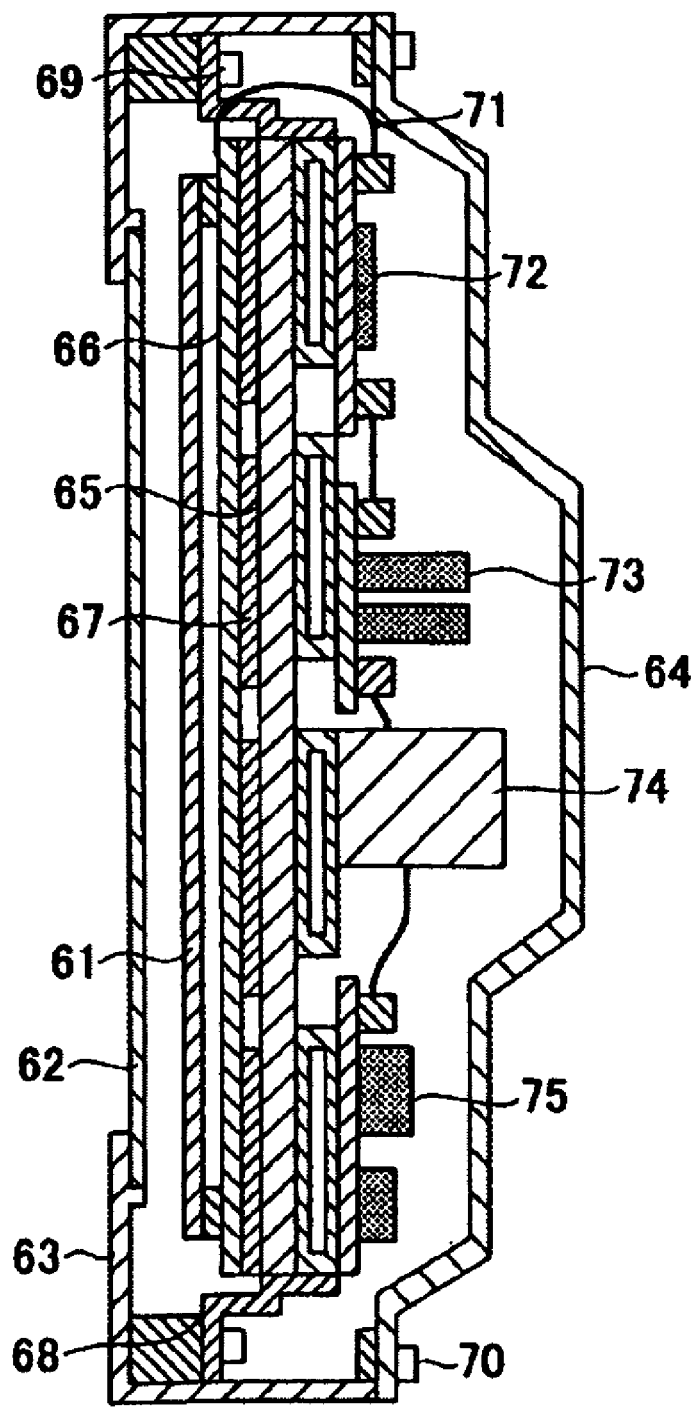
FIG. 6 is a longitudinal sectional view of an example of a conventional thin-shape image display unit.
Figure 7:
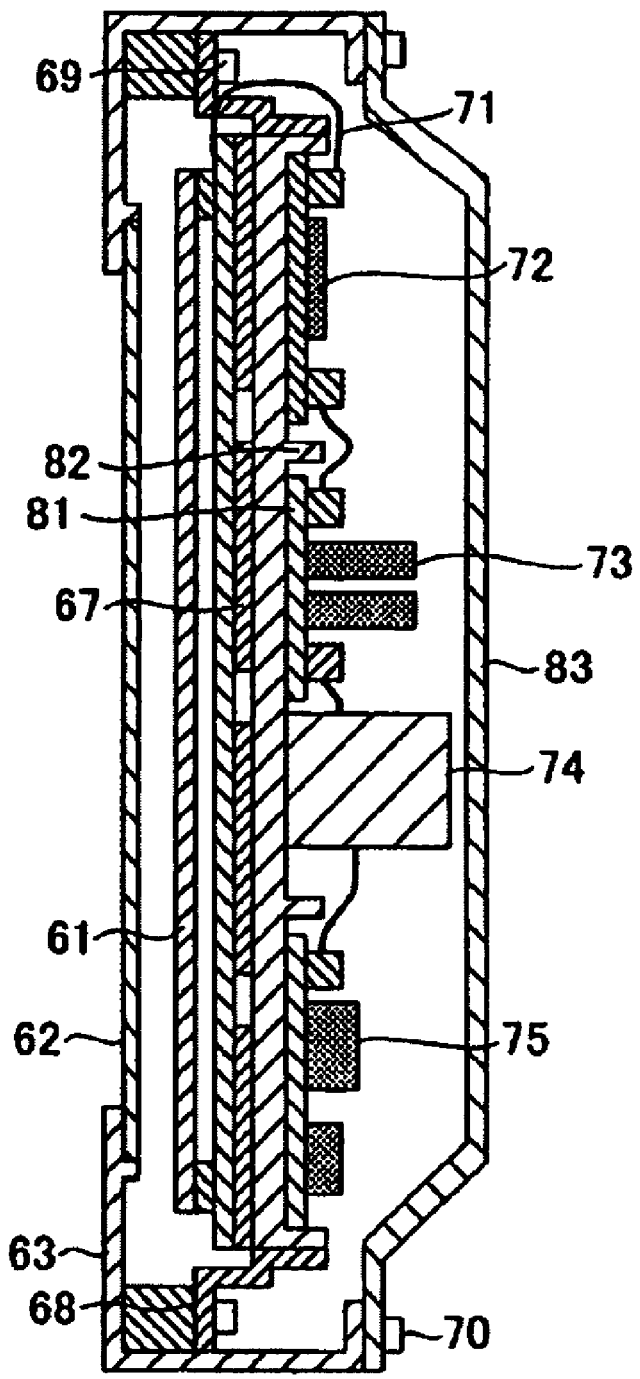
FIG. 7 is a longitudinal sectional view of another example of the conventional thin-shape image display unit.
Figure 8:
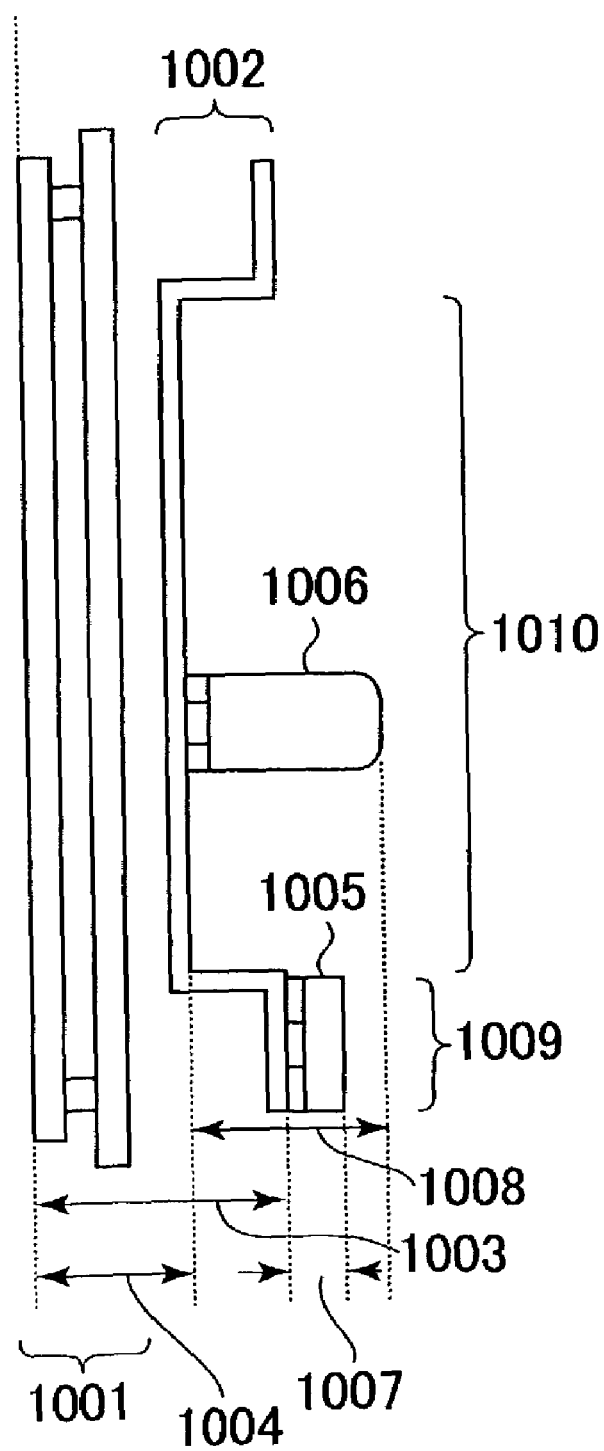
FIG. 8 is a diagram showing the heights of the parts of a support structure and circuits according to the present invention.

FIG. 4 is a longitudinal sectional view showing the most notable characteristics of an image display unit according to a third embodiment of the present invention. FIGS. 5A and 5B are enlarged views of the longitudinal sectional view of an essential part of FIG. 4.

The structure of the third embodiment will be specifically described hereinafter. Components similar to those of the first and second embodiments are denoted by the same reference numerals and a description thereof will be omitted.

A front damper 41 is disposed at the circumference of the front surface of the vacuum vessel 3 except an image display area so as to cover the circumference in the form of a picture frame and to position the rim of the face plate 1 in close contact therewith. The front damper 41 is made of a hard urethane foam.

The front cover 43 has a front frame 40 arranged inside thereof so as to surround the circumference of the front surface of the vacuum vessel 3. The front frame 40 is made of a soft metallic material (for example, stainless steel) with a thickness of about 1 mm, being formed in a predetermined shape by pressing or extruding.

The front frame 40 has a joint section 40a that is brought into close contact with the support bracket 9 in assembly and an engagement section 40b engageable with the front damper 41. The front frame 40 also has female screws (not shown) engageable with screws 42 for fastening the front frame 40 and the support bracket 9. The screws 42 are disposed on four sides of the circumference of the vacuum vessel 3.

The front cover 43 is shaped like a picture frame to protect the image display section and electrical circuits, which will be described later, from dirt and moisture and also has good appearance, being made of an electrically-conductive aluminum base alloy.

A characteristic structure of the present invention will be described hereinafter.

The hollow frame 7 and the plate member 8 serving as a support structure are disposed on the back of the vacuum vessel 3. The hollow frame 7 has thin-shape electrical circuit components including the Y-directional driver circuit 16. The plate member 8 has high-profile electrical circuit components including the supply unit 18 thereon. With such a structural arrangement, the support structure of the vacuum vessel 3 can be decreased in weight and the whole casing can be made thin-shape while maintaining rigidity.

The vacuum vessel 3 is supported between the hollow frame 7 and the front cover 40 through the front damper 41 and the rear damper 31. The vacuum vessel 3 can be dismounted from the unit casing by removing the screws 42 for recycling the unit.

Since the front cover 43 does not have a function of supporting the vacuum vessel 3, the vacuum vessel 3 can be carried while being integrated with the support structure and the electrical circuits without assembling the front cover 43, the front plate 4, and the rear cover 6.

Since the front damper 41 and the rear damper 31 sandwich the circumference of the vacuum vessel 3 in the form of a picture frame, the vacuum vessel 3 can be protected from the external vibration and impact and the drop of the vacuum vessel 3 can be prevented.

The use of the central damper 32 prevents the risk that the vacuum vessel 3 warps by a great impact from the exterior to collide against the plate member 8.

Since a substantially closed space is formed by the front plate 4, the face plate 1, the front damper 41, and the front frame 40, a phenomenon that dirt enters the casing from the exterior to make the display screen of the face plate 1 dirty is prevented.

The hollow frame 7 and the plate member 8 are grounded electrically as in the first embodiment. The front frame 40 is also grounded.

The front frame 40 will be specifically described hereinafter.

FIG. 5A shows the shape of the front frame 40 before assembly. The joint section 40a is formed at an angle of about 5° before assembling the display unit. When it is jointed to the support bracket 9 with the screw 42, the initial angel 5° of the joint section 40a becomes about 0°. Here, the engagement section 40b of the front frame 40 works toward the right of the drawing (in the direction to sandwich the vacuum vessel 3 with the hollow frame 7) by the stress in the front frame 40, thereby sandwiching and supporting the vacuum vessel 3 while pressurizing it all the time. Since the method of connecting the hollow frame 7 and the front cover 43 is similar to that of the first embodiment, the drawing and description will be omitted. However, preferably, the components constructing the above connection are arranged so as to be dispersed in positions not to interfere with the support bracket 9.

With such a structure, the image display unit has the following advantages:

1) Since high-profile electrical circuits including the supply unit 18 are disposed on the plate member 8 and thin-shape electrical circuits including the Y-directional driver circuit 16 are disposed on the hollow frame 7, the thickness of the whole casing is reduced; therefore, the marketability is increased.

2) Since the 10-mm-thick hollow frame 7 shaped like a picture frame and the 1.5-mm-thick plate member 8 arranged at the center are used, the support structure of the vacuum vessel 3 can be reduced in weight; thus, the marketability is increased.

3) Since the vacuum vessel 3 is protected from an external impact and vibration by the 10-mm-thick hollow frame 7 shaped like a picture frame, the reliability is increased.

4) Since the hollow frame 7, the plate member 8, and the front frame 40 are grounded electrically, the waveforms of image display signals flowing in the wirings on the surface of the rear plate 2 are stabilized; thus, the image quality is improved and undesired electromagnetic waves leaking to the exterior can be decreased, so that the marketability is increased and the load on environment can be reduced.

5) Since the vacuum vessel 3 is sandwiched by the front frame 40 and the hollow frame 7 through the dampers 31 and 41, disassembly workability in recycling is improved.

6) Since the vacuum vessel 3 can be carried together with the support structure and the electrical circuits even without an armoring cover, it can be transferred flexibly in production; thus, a decrease in production cost and shipping per unit of image display module become possible, so that sales channels can be increased.

7) Since a substantially closed space is formed by the front frame 40 shaped like a picture frame, the front damper 41, the front plate 4, and the face plate 1, a phenomenon that dirt enters the casing from the exterior to make the display screen dirty, thus making it hard to see, is prevented; thus, the reliability is increased.

According to the present invention, the back of the display section can effectively be used as a circuit arrangement space, and a thin-shape image display unit as a whole or a unit having a decreased protrusion to the back can be provided.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image display unit comprising:
   an image display section:
   a support structure supporting said image display section, said support structure comprising a higher part having a predetermined height in the direction from a front side to a back side of said image display section and a lower part lower than said higher part in said direction;
   a first circuit, wherein said first circuit has the largest height from the back side of said support structure among a plurality of circuits disposed on the back side of said support structure; and
   a second circuit having a height, from the back side of said support structure, lower than said height of said first circuit,
   wherein said first circuit is disposed on said lower part and said second circuit is disposed on said higher part,
   wherein both said higher part and said lower part are made of an electrically conductive material and are provided with a ground potential.

2. An image display unit according to claim 1, wherein said higher part is arranged to have a cross-section in a picture-frame shape.

3. An image display unit according to claim 2, wherein said lower part is disposed so as to be surrounded by said higher part.

4. An image display unit according to claim 1, wherein said higher part is positioned in the vicinity of the circumference of said image display section.

5. An image display unit according to claim 4, wherein said image display section includes a plurality of display elements and a plurality of wirings for applying signals for driving the display elements, and said circuits arranged on said higher part supply the signals to said plurality of wirings.

6. An image display unit according to claim 1, wherein said first circuit is a supply circuit for supplying electric power to at least one of said plurality of circuits.

7. An image display unit according to claim 1, wherein the difference between the heights of said higher part and said lower part is 5 mm or more.

8. An image display unit according to claim 1, wherein at least one of said parts is made of an electromagnetic shielding material.

9. An image display unit according to claim 6, wherein said plurality of circuits provided at said lower part supplies electric power to said plurality of circuits provided at said higher part.

10. An image display unit according to claim 8, wherein said lower part is made of an electromagnetic shielding material.

11. An image display unit according to claim 8, wherein said electromagnetic shielding material is aluminum base alloy.

12. An image display unit, comprising:
image display means for displaying an image; and
supporting means for supporting said image display means, said supporting means including a first part having a first height in a viewing direction of the displayed image and a second part having a second height lower than the first height in the viewing direction, wherein
said image display means includes a plurality of circuits arranged on said first and second parts, with a circuit of maximum height among said plurality of circuits being arranged on said second part, and
both said first and second parts are made of an electrically conductive material and are provided with a ground potential.

13. An image display unit, comprising:
image display means for displaying an image; and
a supporting structure to support said image display means, said supporting structure including a first part having a first height in a viewing direction of the displayed image and a second part having a second height lower than the first height in the viewing direction, wherein
said image display means includes a plurality of circuits arranged on said first and second parts, with a circuit of maximum height among said plurality of circuits being arranged on said second part, and
both said first and second parts are made of an electrically conductive material and are provided with a ground potential.

14. An image display unit including an image display section, comprising:
a support structure supporting the image display section, said support structure comprising a higher part having a predetermined height in the direction from a front side to a back side of the image display section and a lower part lower than said higher part in said direction; and
a plurality of circuits disposed on the back side of each of said higher and lower parts of said support structure, wherein
said plurality of circuits have different heights, and the circuit having the greatest height is arranged on said lower part,
wherein a cross-section of said higher part in a direction orthogonal to said image display section has at least one hollow portion.

15. An image display unit according to claim 12, wherein a cross-section of said first part in a direction orthogonal to said image display means has at least one hollow portion.

16. An image display unit, comprising:
image display means for displaying an image; and
a supporting structure to support said image display means, said supporting structure including a first part having a first height in a viewing direction of the displayed image and a second part having a second height lower than the first height in the viewing direction, wherein
said image display means includes a plurality of circuits arranged on said first and second parts, with a circuit of maximum height among said plurality of circuits being arranged on said second part,
wherein a cross-section of said first part in a direction orthogonal to said image display means has at least one hollow portion.

17. An image display unit according to claim 1, wherein said first circuit has the largest height from the back side of said support structure among all of said circuits disposed on the back side of said support structure.

* * * * *

UNITED STATES PATENT AND TRADEMARK OFFICE
CERTIFICATE OF CORRECTION

PATENT NO.         : 6,989,817 B2
APPLICATION NO. : 10/287496
DATED              : January 24, 2006
INVENTOR(S)        : Hisao Tajima It is certified that error appears in the above-identified patent and that said Letters Patent is hereby corrected as shown below:

<u>COLUMN 2:</u>

Line 28, "corporation" should read --cooperation--.

<u>COLUMN 11:</u>

Line 40, "angel" should read --angle--.

<u>COLUMN 12:</u>

Line 40, "section:" should read --section;--.

Signed and Sealed this

Tenth Day of October, 2006

JON W. DUDAS
*Director of the United States Patent and Trademark Office*